US008611508B2

(12) United States Patent
Myers et al.

(10) Patent No.: US 8,611,508 B2
(45) Date of Patent: *Dec. 17, 2013

(54) METHOD AN APPARATUS FOR CONVERTING A VOICE SIGNAL RECEIVED FROM A REMOTE TELEPHONE TO A TEXT SIGNAL

(75) Inventors: Theodore James Myers, East Dundee, IL (US); Patrick Jay Walsh, Bloomingdale, IL (US); Muna Nabilsi, Palatine, IL (US); Kevin D. Kaschke, Hoffman Estates, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 50 days.

This patent is subject to a terminal disclaimer.

(21) Appl. No.: 13/182,169

(22) Filed: Jul. 13, 2011

(65) Prior Publication Data

US 2011/0268259 A1 Nov. 3, 2011

Related U.S. Application Data

(63) Continuation of application No. 12/001,893, filed on Dec. 13, 2007, now Pat. No. 7,983,400, which is a continuation of application No. 10/410,586, filed on Apr. 8, 2003, now Pat. No. 7,359,492, which is a continuation of application No. 09/391,426, filed on Sep. 8, 1999, now abandoned.

(51) Int. Cl.
*H04M 11/00* (2006.01)

(52) U.S. Cl.
USPC .................................................. 379/88.14

(58) Field of Classification Search
USPC .................. 379/88.03, 88.13–88.14; 455/566
See application file for complete search history.

(56) References Cited

U.S. PATENT DOCUMENTS 5,321,737 A   6/1994   Patsiokas
5,459,774 A   10/1995  Breeden
5,504,805 A   4/1996   Lee (Continued)

OTHER PUBLICATIONS

Kolnes, Steinar, Method for Recording and Storing Received Sound Signal in Connection with a Telephone Apparatus, WO 9918577, Apr. 15, 1999.

(Continued)

*Primary Examiner* — Simon Sing (57) ABSTRACT

A telephone call is established between a local telephone (110) associated with a local party and a remote telephone (104) associated with a remote party. The local telephone (110) receives a voice signal from the remote telephone (104) responsive to establishing the telephone call. The voice signal represents directory assistance information, a name, a phone number or directions provided by the remote party. The local telephone (110) stores the voice signal in a memory unit (212) in the local telephone (110) responsive to receiving the voice signal. The local telephone (110) converts the voice signal to a text signal responsive to storing the voice signal. The local telephone (110) stores the text signal in the memory unit (214) in the local telephone (110) responsive to converting the voice signal to a text signal. The local telephone (110) edits the stored text signal in the memory unit responsive to storing the text signal. The local telephone (110) correlates the remote party's identity with the stored voice and/or text signal responsive to storing the voice and/or text signal. The local telephone (110) uses the stored edited text signal to make a new telephone call or to transfer the stored edited text signal to another electronic device.

20 Claims, 4 Drawing Sheets

(56) References Cited

U.S. PATENT DOCUMENTS

| | | |
|---|---|---|
| 5,651,056 A | 7/1997 | Eting et al. |
| 5,740,543 A | 4/1998 | Maeda |
| 5,749,052 A | 5/1998 | Hidem et al. |
| 5,764,731 A | 6/1998 | Yablon |
| 5,812,638 A | 9/1998 | Muller |
| 5,867,793 A | 2/1999 | Davis |
| 6,097,964 A | 8/2000 | Nuovo et al. |
| 6,138,096 A | 10/2000 | Chan et al. |
| 6,151,572 A | 11/2000 | Cheng et al. |
| 6,173,250 B1 | 1/2001 | Jong |
| 6,178,338 B1 * | 1/2001 | Yamagishi et al. ........... 455/566 |
| 6,222,909 B1 | 4/2001 | Qua et al. |
| 6,309,305 B1 | 10/2001 | Kraft |
| 6,366,651 B1 | 4/2002 | Griffith et al. |
| 6,393,296 B1 | 5/2002 | Sabnani et al. |
| 6,427,006 B1 | 7/2002 | Reding et al. |
| 6,430,270 B1 | 8/2002 | Cannon et al. |
| 6,449,342 B1 | 9/2002 | Johanson |
| 6,473,496 B1 | 10/2002 | Mohageg |
| 6,823,050 B2 | 11/2004 | Brown et al. |

OTHER PUBLICATIONS

Internet Web page entitled "Motorola Consumer Catalog—V3620 Wireless Phone", Aug. 12, 1999.
Internet Wb page entitled "Dragon Systems, Inc.", Aug. 12, 1999.
Internet Web page entitled "TT Systems Corporation—Telephone and Accessories for Home and Office," Aug. 12, 1999.

* cited by examiner

METHOD AN APPARATUS FOR CONVERTING A VOICE SIGNAL RECEIVED FROM A REMOTE TELEPHONE TO A TEXT SIGNAL

RELATED APPLICATIONS

The present application is a continuation of U.S. patent application Ser. No. 12/001,893, filed Dec. 13, 2007, which is a continuation of application Ser. No. 10/410,586, filed Apr. 8, 2003, now U.S. patent application Ser. No. 7,359,492, which is a continuation application Ser. No. 09/391,426, filed Sep. 8, 1999, now abandoned, all of which are hereby incorporated herein in their entirety by this reference.

FIELD OF THE INVENTION

The present invention relates generally to telephones, including landline and wireless telephones, and more particularly to a method and an apparatus for converting a voice signal, received from a remote telephone, to a text signal.

BACKGROUND OF THE INVENTION

With the widespread use of landline and cellular telephones, telephone network providers have expanded the number and types of services and information available to such telephones. Some services or information include, for example, voice mail, call waiting, call forwarding, three way calling, caller identification, call blocking, automatic call back, basic and enhanced directory assistance, etc. However, the increased number and type of these services and information provides a user of a telephone with more information than ever before. Sometimes a user of a telephone is not able to quickly or efficiently understand or retain the amount of information received while using the telephone. For example, when a person is using a cellular phone while walking or driving, it is challenging for the person to record, such as using a pen or pencil, directions, a name or even a phone number received as a voice signal from a remote telephone. Moreover, the person must manually enter the recorded information into a memory unit of a telephone, a personal digital assistant, a personal computer, or another electronic device to electronically store the information for later use or reference.

U.S. Pat. No. 5,749,052, issued May 5, 1998, entitled "Cellular Telephone Management System" discloses at column 13, lines 8-29 a method for operating a cellular telephone. The cellular telephone receives a phone number, represented by dual tone multiple frequency (DTMF) signals generated by a touch tone keypad, from a remote telephone operated by a remote caller during a telephone call. The DTMF signals received by the cellular telephone are converted into a phone number, stored in a scratchpad memory in the cellular telephone and shown in a display of the cellular telephone. When the user of cellular telephone is finished talking to the remote caller and terminates the call, the number entered in the scratchpad memory remains in the display. To dial the phone number shown in the display and stored in the scratchpad memory, the user of the cellular telephone depresses the send key on the keyboard of the cellular telephone. Although this patent discloses receiving and storing a phone number represented by DTMF signals generated by the remote telephone, this patent does not disclose that the cellular telephone receives a voice signal from a remote telephone and converts the voice signal to a text signal for storage in the cellular telephone.

Motorola, Inc., having a place of business at 600 North U.S. Highway 45, Libertyville, Ill., 60048,U.S.A. and having an internet web site located at http://www.motorola.com, sells a cellular telephone model V3620 with a built in voice answering machine. The voice answering machine records voice signals sent from a remote telephone when the user of cellular telephone is not available to answer an incoming telephone call from the remote telephone and plays back the recorded voice signals at the user's convenience. Although this cellular telephone receives and stores voice signals received from the remote telephone when the user of the cellular telephone is not available, this cellular telephone does not convert the received or stored voice signals from the remote telephone into text signals for storage in the cellular telephone.

TT Systems, Corporation, having a business location at Seven Odell Plaza, Yonkers, N.Y., 10701, U.S.A. and having an internet web site located at http://www.ttsystems.com, sells a series of devices called Tele-Recorders™, including the Tele-Recorder™ 100, 300, 400 and 500 products. These devices are external devices that connect to landline telephones for recording live conversations on the phone line connected to the landline telephone that is in use. Some of these devices may also be used for dictation, personal memos, or recording local conferences when the landline telephone is not in use. Some of these devices have a voice activated system which starts and stops recording by detecting voice or sound so that no recording occurs during silent pauses. Although these devices receive and store voice signals received from a remote telephone during a telephone call, these devices do not convert the received or stored voice signals into text signals for storage in the devices.

Dragon Systems, Incorporated, having a business location at 320 Nevada Street, Newton, Mass. 02460, U.S.A. and having an internet web site located at http://www.dragonsys.com, sells a portable recorder called Dragon NaturallySpeaking ™ Mobile. The recorder records voice signals for dictation and personal memos. Dragon System's voice transcription software installed in a personal computer automatically transcribes either recorded voice signals from the recorder or live voice signals into text signals for storage in the personal computer. Although the recorder receives and stores voice signals, the recorder does not convert the voice signals into text signals for storage in the recorder, the recorder is not a telephone and the recorder does not receive the voice signals sent from a remote telephone. Further, although the personal computer transcribes voice signals into text signals using the voice transcription software, the personal computer is not a telephone and the personal computer does not receive the voice signals received from a remote telephone.

Accordingly, there is a need for a method and an apparatus for converting a voice signal, received from a remote telephone, to a text signal to permit electronic storage of the text signal in a memory unit thereby eliminating the need for a person to manually record the received information and then to manually transfer the recorded information into the memory unit.

DETAILED DESCRIPTION OF THE PRESENTLY PREFERRED EMBODIMENTS

In a preferred embodiment of the present invention, a telephone call is established between a local telephone associated with a local party and a remote telephone associated with a remote party. The local telephone receives a voice signal transmitted by the remote telephone responsive to establishing the telephone call. The voice signal represents, for example, directory assistance information, a name, a phone number, directions or other information provided by the remote party. The local telephone stores the voice signal in a memory unit, located preferably in the local telephone, responsive to receiving the voice signal. The local telephone converts the voice signal to a text signal responsive to storing the voice signal in the memory unit. The local telephone stores the text signal in the memory unit responsive to converting the voice signal to a text signal. The local telephone edits the stored text signal in the memory unit responsive to storing the text signal. The local telephone correlates the remote party's identity with the stored voice and/or text signal responsive to storing the voice and/or text signal in the memory unit. The local telephone uses the stored edited voice and/or stored edited text signal to make a new telephone call, or to transfer the stored edited voice and/or stored edited text signal to a personal computing device or another telephone. The method of operation of the local telephone advantageously converts a voice signal, received from a remote telephone, to a text signal for electronic storage in a memory unit in the local telephone thereby eliminating the need for a person to manually record the received information and then to manually transfer the recorded information into the memory unit.

Figure 1:
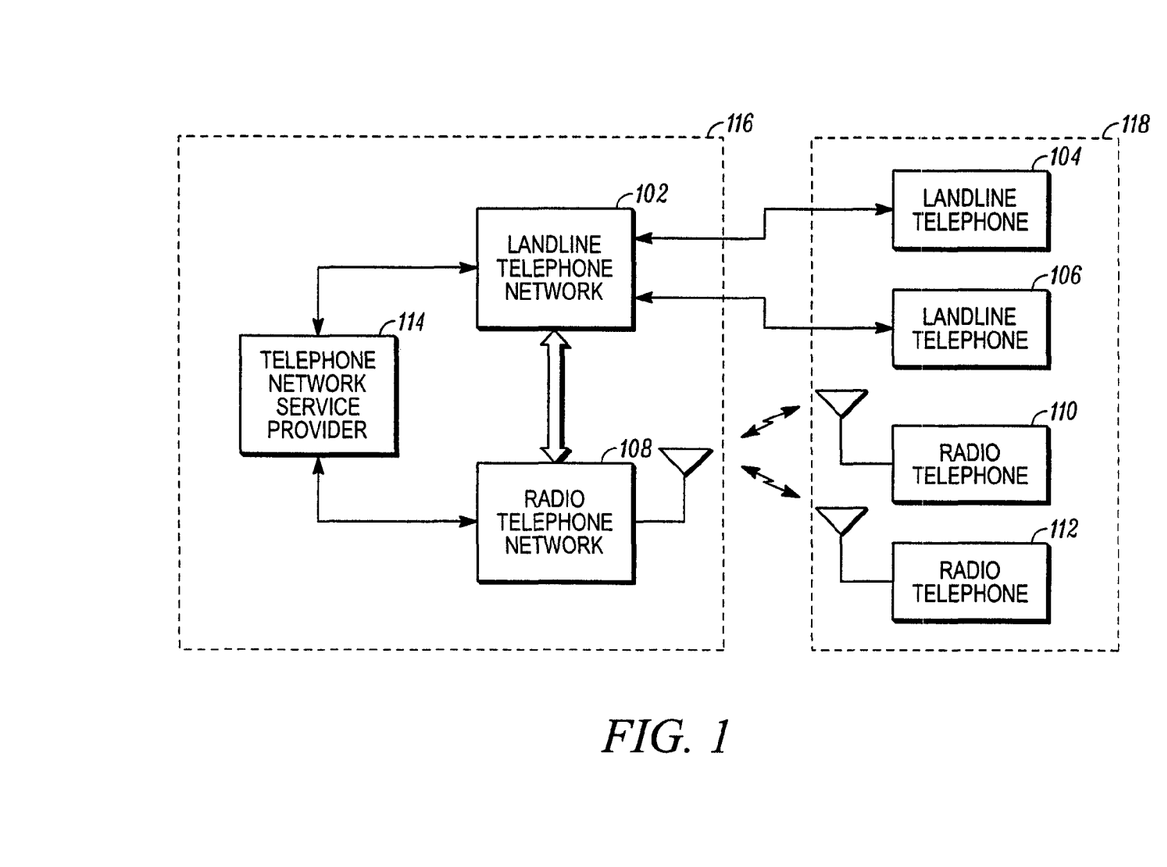
FIG. 1 illustrates a block diagram of a telephone system in accordance with a preferred embodiment of the present invention.

FIG. 1 illustrates a block diagram of a telephone system 100 in accordance with the preferred embodiment of the present invention. FIG. 1 generally includes a landline telephone network 102, landline telephones 104 and 106, a radio telephone network 108, radio telephones 110 and 112, and a telephone network service provider 114. The landline telephone network 102 provides communications between the landline telephones 104 and 106, as is well known in the art. The radio telephone network 108 provides communications between radio telephones 110 and 112, as is well known in the art. The landline telephone network 102 and the radio telephone network 108 communicate to provide a communication network 116 to route communications between the landline telephones 104 and 106 and the radio telephones 110 and 112, as is well known in the art. The telephone network service provider 114 is typically associated with the landline telephone network 102 and typically communicates directory assistance information to the radio telephones 110 and 112 and to the landline telephones 104 and 106. Such directory assistance information typically includes basic information such as a name, an address and/or a phone number of a person or a business, for example, and sometimes includes relatively complicated information such as directions to a particular place, such as a restaurant, as are well known in the art.

In general, the preferred embodiment of the present invention is a method performed at least partially by a telephone subscriber unit that communicates over a communication network. In FIG. 1, the telephone subscriber units 118 are represented by, but not limited to, the landline telephones 104 and 106 and the radio telephones 110 and 112. The term telephone subscriber unit generally represents any type of telephone device that can make and/or receive telephone calls. In FIG. 1, the communication network is represented by, but not limited to, the landline telephone network 102 and the radio telephone network 108. The term communication network generally represents any type of communication path that can carry telephone calls. Therefore, the telephone subscriber units may also represent integral parts of other devices such as personal computers or personal digital assistants. Further, the communication network may also represent an internet or intranet permitting communication among various computing or telephone devices, whether fixed or mobile.

In the preferred embodiment of the present invention, the terms "local telephone" and "remote telephone" are used and generally refer to first and second telephone subscriber units, respectively, communicating over a communication path. The terms "local" and "remote" are used to provide a more concrete perspective from which to view the method of the present invention implemented in one telephone relative to another telephone. The local telephone is associated with a local party operating the local telephone. The remote telephone is associated with a remote party operating the remote telephone. The method of the present invention may be implemented in any of the subscriber telephone units independently of any other of the telephone subscriber units or of the communication network in the telephone system. For convenient reference herein the local telephone is arbitrarily defined to be radio telephone 110 and the remote telephone is arbitrarily defined to be landline telephone 104.

In particular, the preferred embodiment of the present invention is a method, performed at least partially by a local telephone, for converting a voice signal, received from a remote telephone, to a text signal. Therefore, two telephones are communicating over a communication network. One of the telephones, the so called local telephone, has the method of the preferred embodiment implemented therein and receives a voice signal from another one of the telephones, the so called remote telephone. The local telephone enables the received voice signal to be converted to a text signal for electronic storage in a memory unit. The remote telephone does not need to have any particular software or hardware configuration and may be a conventional telephone. Thus, the method may be implemented in new telephones without regard to any changes in existing telephones to yield the advantages disclosed herein.

The advantages of a telephone providing this method of operation are significant. By converting voice signal, received from the remote telephone, to the text signal for electronic storage in the memory unit the need for a person to manually record the received information and then to manually transfer the recorded information into the memory unit is eliminated. Thus, a telephone having this capability permits a person to capture information in an electronic format without having to use a paper and pencil. This advantage is especially useful in a mobile environment, such as with cellular radio telephones, when a person using the telephone is on the move, such as when walking or driving, and cannot conveniently write down the received information. Further, any information written down on paper is at risk of being misplaced or lost before the person needs the information for reference or for entering into the telephone or another electronic device. Therefore, a telephone having this method give a person using the telephone an increased ability to capture the received information without impeding the person's mobility or without the need for the person to have additional manual recording devices, such as a pencil and paper.

Figure 2:
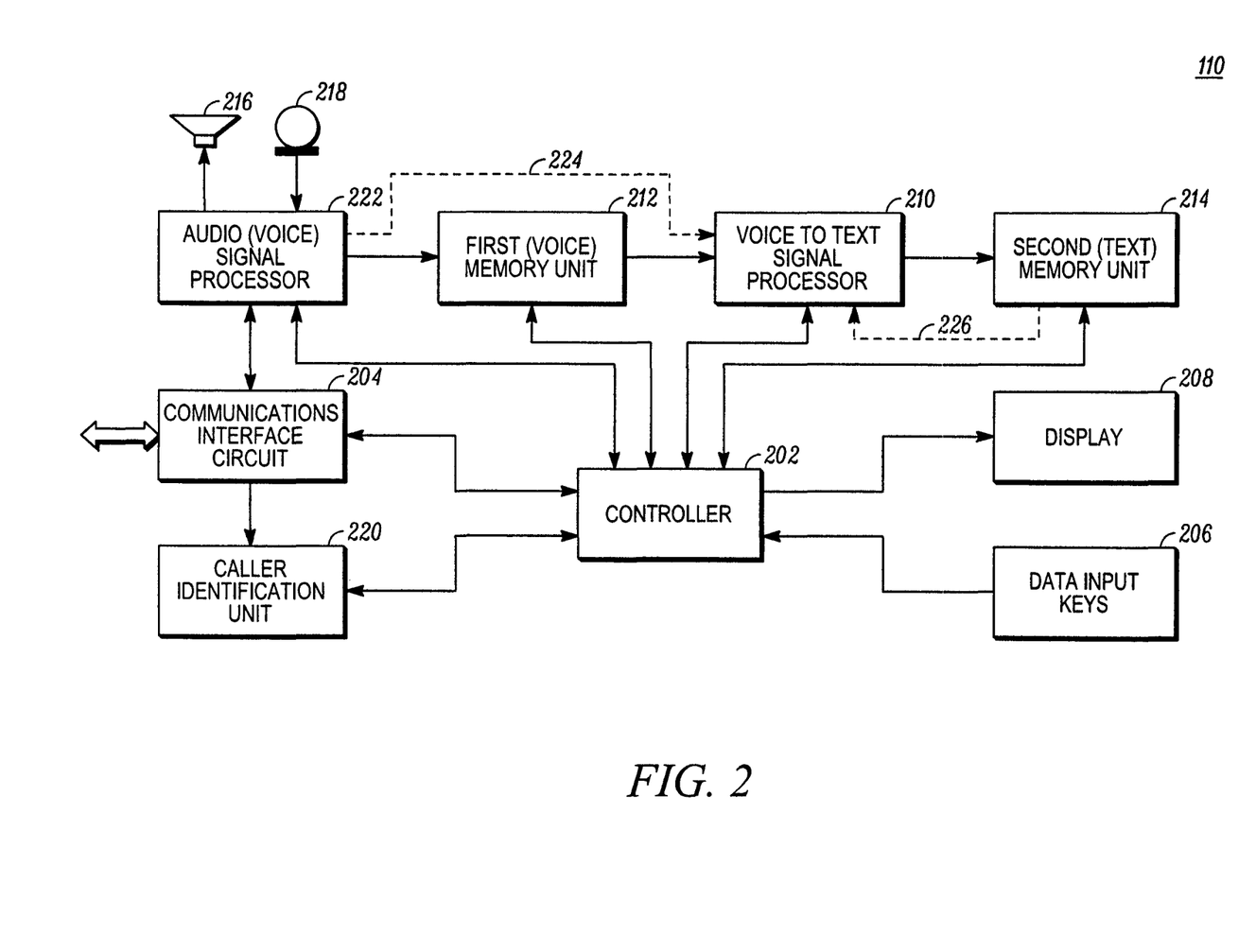
FIG. 2 illustrates a block diagram of an apparatus for converting a voice signal, received from the remote telephone, to a text signal in accordance with a preferred embodiment of the present invention.

FIG. 2 illustrates a block diagram of an apparatus for converting a voice signal, received from the remote telephone, to a text signal in accordance with a preferred embodiment of the present invention. In the preferred embodiment of the present invention, the apparatus is the local telephone 110. The local telephone 110 generally includes a controller 202, a communications interface circuit 204, data input keys 206, a display 208, a voice signal to text signal processor 210, a first memory unit 212, a second memory unit 214, a speaker 216, a microphone 218, a caller identification unit 220, and an audio signal processor 222. The controller 202 is coupled to the communications interface circuit 204, the data input keys 206, the display 208, the voice signal to text signal processor 210, the first memory unit 212, the second memory unit 214, the caller identification unit 220 and the audio signal processor 222.

The communications interface circuit 204 communicates voice, data and/or video signals between the local telephone 110 and the remote telephone 104 via the communication network or directly with the remote telephone 104. When the local telephone 110 is a radio telephone, as in the preferred embodiment, the communications interface circuit 204 typically includes a radio frequency (RF) transmitter, a RF receiver and a radio frequency synthesizer, as is well known in the art. Alternatively, when the local telephone is a landline telephone, the communications interface circuit 204 typically includes a tip and ring circuit, as is well known in the art. Still alternatively, when the local telephone is an internet telephone, the communications interface circuit 204 typically includes an analog modem coupled to a conventional landline telephone line, a digital subscriber modem coupled to a digital subscriber line associated with the landline telephone network, or a cable subscriber modem coupled to a coaxial cable.

The data input keys 206 generate data signals for input to the controller 202 responsive to manual actuation thereof by the local party. The data input keys 206 generally includes, but is not limited to, a traditional three by four keypad, a touch screen input device, and smart or control keys. When the local telephone 110 is a radio telephone, as in the preferred embodiment, the traditional three by four keypad or the touch screen input device is typically located on a front face of the radio telephone's housing and the smart or control keys are located on one or both of the front face and a side face of the radio telephone housing. Alternatively, when the local telephone is a land line telephone, the data input keys 206 are typically located on a front face of the landline telephone's housing. Still alternatively, when the local telephone is an Internet telephone, the data input keys 206 are typically located on a keyboard separate from or integrated with the Internet telephone.

The display 208 receives data signals from the controller 202 to present visual information for the local party on the display 208. The display 208 may be implemented with any type of display technology including, but not limited to, liquid crystal displays (LCD), light emitting diode displays (LED), liquid plasma displays (LPD), vacuum florescent displays (VFD) and cathode ray tubes (CRT). When the local telephone 110 is a radio telephone, as in the preferred embodiment, the display 208 is typically located on a front face of the radio telephone's housing. Alternatively, when the local telephone is a landline telephone, display 208 is typically located on a front face of the landline telephone's housing. Still alternatively, when the local telephone is an Internet telephone, display 208 is typically a thin film transistor (TFT) LCD or a CRT either separate from or integral to the Internet telephone.

The voice signal to text signal processor 210 preferably represents a computer memory having voice to text transcription software associated therewith Alternatively, the voice signal to text signal transcription may be implemented fully in hardware, such as a digital signal processor (DSP). The voice signal to text signal processor 210 may be of a basic design capable of only transcribing synthesized voice signals representing numeric data, such as a telephone number, or a somewhat more advanced design capable of transcribing live voice signals representing numeric data, such as a telephone number, or an even more advanced design capable of transcribing live voice signals representing alpha or numeric information, such as a telephone number, a name or directions. The level of design of the voice signal to text signal processor 210 depends upon such engineering tradeoffs such as the power of the processor and the complexity of the voice to text transcription software.

The first memory unit 212 generally represents a medium for storing a voice signal. The first memory unit 212 may be implemented with any type of memory technology including, but not limited to, analog and digital memory technology.

The second memory unit 214 generally represents a medium for storing a data or text signal. The first memory unit 212 may be implemented with any type of memory technology including, but not limited to, analog and digital memory technology. The first memory unit 212 may include a telephone scratchpad memory location in the second memory unit and/or a telephone directory memory location in the second memory unit. The telephone scratchpad memory location and the telephone directory memory location alone are well known in the art.

The first memory unit 212 and the second memory unit 214 may be implemented in the same physical device such as in a digital memory chip or may be implemented in separate physical devices such as when the first memory unit 212 is implemented with an analog memory device, such as a tape drive, and the second memory unit 214 is implemented with a digital memory chip.

The caller identification unit 220 generally represents a way for the local party to electronically determine a representation of the identity of the remote party, such as the remote party's name and/or phone number. The identity of the remote party caller may be provided by a telephone network service provider and decoded by the caller identification unit 220 or may be determined by the caller identification unit 220 without the assistance of the telephone network service provider. The caller identification unit 220 may be implemented either integral to or separate from a telephone, as is well known in the art.

With the voice transcription technology available today, the voice to text signal processor 210, the second memory unit 214 and the display 208 could practically be implemented in the local telephone 110, configured as a cellular radio telephone, to perform a basic voice transcription function mentioned hereinabove as only transcribing real or synthesized voice signals representing numeric data, such as a telephone number. As is discussed herein below with reference to FIG. 3, providing only this basic voice transcription function completely in the local telephone 110, such as a cellular radio telephone, provides the powerful advantage of capturing real or synthesized voice telephone directory information from the telephone network service provider 114 for conversion to a text signal for electronic storage in the second memory unit 214 in the local telephone 110.

However, today a cellular radio telephone may not have the processing power, memory space or battery power available to perform more advanced voice transcription functions discussed hereinabove with reference to the voice to text signal processor 210. Therefore, the voice to text signal processor 210, the second memory unit 214 and the display 208 may alternatively be located in an electronic device which is separate from and outside the housing of the local telephone 110. The electronic device may be, for example, a desktop personal computer, a portable notebook personal computer, a personal digital assistant, or the like. Hence, the local telephone 110, such as a cellular radio telephone, may receive and store the first voice signal in the first memory unit 212 when the first voice signal is received from the remote telephone 104. Then the local party would electronically couple the local telephone 110 to the other electronic device to permit the other electronic device to download the first voice signal from the first memory unit in the local telephone 110 to the electronic device. Such electronic coupling may be made, for example, by a wire, a radio or an infrared frequency signal, a housing connection having electrical contacts, or the like. Then the electronic device would convert the downloaded first voice signal to the first text signal and electronically store the first text signal in the second memory unit 214 in the electronic device. The first text signal stored in the second memory unit 214 of the electronic device may remain there or be transferred back to the local telephone 110, at the local party's discretion. This particular case advantageously permits the local telephone to capture the first voice signal from the remote telephone 104 for later processing into a text signal by more powerful voice transcription software and hardware located in the external device. Note that both this remote voice transcription system and the self-contained voice transcription system described hereinabove may be implemented in the same local telephone 110 to advantageously provide the local party with the flexibility to use either system depending on the complexity of the first voice signal and the sophistication of the local telephone and the external electronic device. As technology advances, it is preferred to move as much voice transcription technology and power into the local telephone to provide the local party with the most mobility, such as with a cellular radio telephone, or the most autonomy, such as with a landline telephone.

Figure 3:
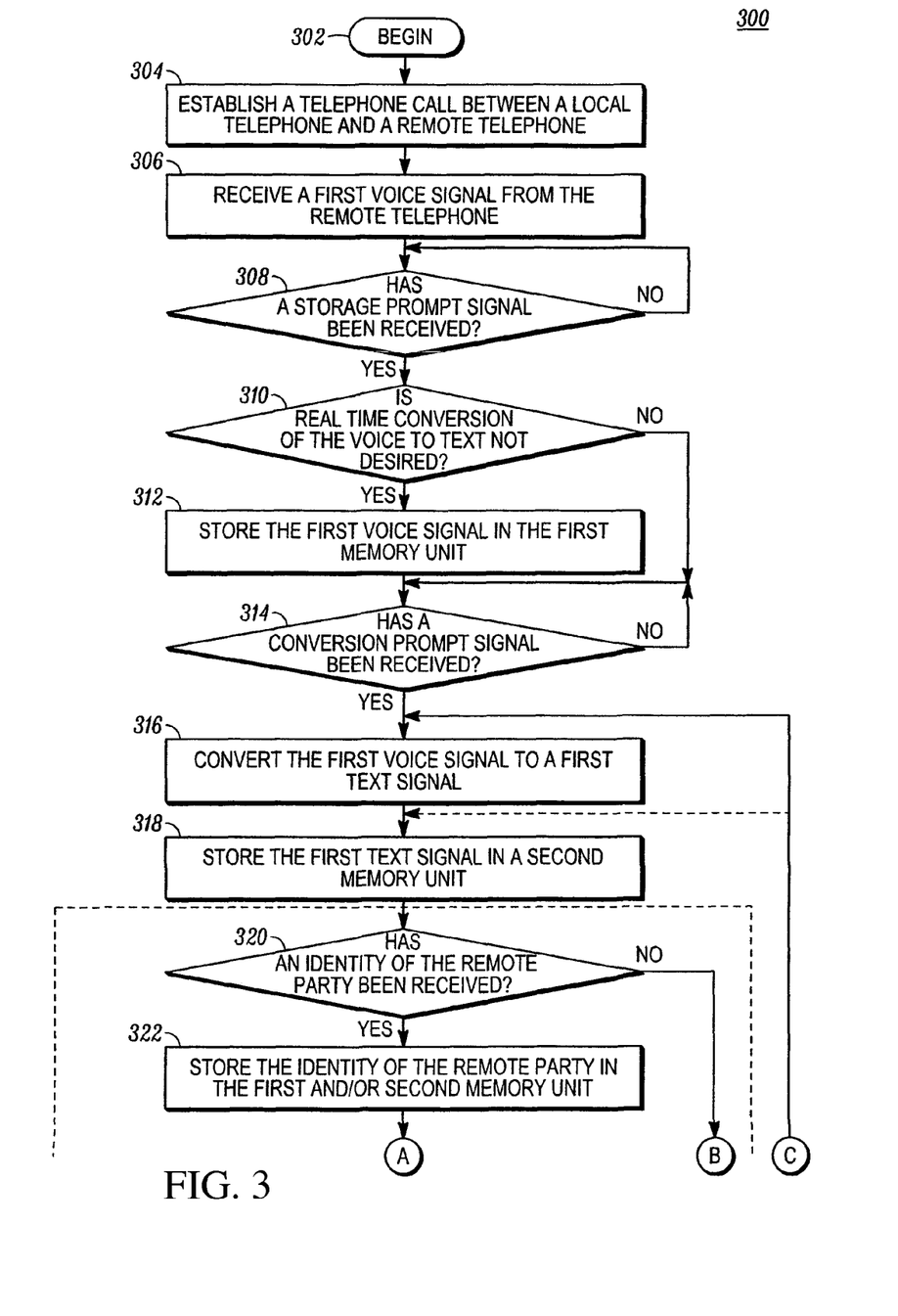
FIG. 3 illustrates a flowchart describing a method for converting a voice signal, received from the remote telephone, to a text signal in accordance with a preferred embodiment of the present invention.

FIG. 3 illustrates a flowchart 300 describing a method for converting a voice signal, received from the remote telephone, to a text signal in accordance with a preferred embodiment of the present invention. In the preferred embodiment of the present invention, the method is performed entirely by the local telephone 110.

At step 302, the method begins. At step 304, a telephone call is established between the local telephone 110 associated with the local party and the remote telephone 104 associated with the remote party. In the preferred embodiment of the present invention, the telephone call is established by the local telephone 110 making the telephone call to the remote telephone 104. In this case, the local party makes the telephone call to the remote telephone 104 associated with the network service provider 114 to request directory assistance information from the telephone network service provider 114. The local party may make the call in any manner, such as by recalling a telephone number from the telephone directory portion of the second memory 214, by manually inputting the telephone number using the data input keys 206 or by inputting the telephone number by speaking the telephone number into a voice recognition device, such as the microphone 218 coupled to the voice to text signal processor 210. Alternatively, the telephone call may be established by the local telephone 110 receiving the telephone call from the remote telephone 104, as is well known in the art.

At step 306, the local telephone 110 receives a first voice signal from the remote telephone 104 during the telephone call responsive to the step of establishing at step 304. In the preferred embodiment of the present invention, the first voice signal received from the remote telephone 104 is a synthesized or live voice signal generated by the remote party associated with the telephone network service provider 114 during the telephone call. The synthesized or voice signal generated by the telephone network service provider 114 represents information requested or desirable to the local party such as, for example, a telephone number, a name of a person or business or directions to a particular place.

Alternatively, at step 306, the first voice signal received from the remote telephone 104 may be a live voice signal generated by the remote party during the telephone call. In this case, the local party may be receiving a telephone number or directions from the remote party, such as a friend or family member.

Still alternatively, at step 306, the first voice signal received from the remote telephone 104 may be a stored voice signal generated by the remote party prior to establishment of the telephone call. In this case, the local party may be receiving a telephone number, directions or other information from the remote party via an automated answering service.

Further, at step 306, in the preferred embodiment of the present invention, the local party is listening to the first voice signal as it is being received from the remote telephone, such as in the case when the local party requests directory assistance information. Alternatively, the local party may not need to listen to the first voice signal as it is being received from the remote telephone, such as in the case when a message is recorded by the local telephone 110 when the local party is absent or unable to answer an incoming telephone call from the remote telephone 104. In this case, the first voice signal may be received at one time and then converted into a text signal at a later time after the call has been completed.

At step 308, the local telephone 110 determines whether a storage prompt signal has been received. If the storage prompt signal has not been received, the method waits for one to be received at step 308. If the storage prompt signal has been received, the method continues to step 310. In the preferred embodiment of the present invention, the storage prompt signal is a distinctive audio service prompt signal generated by a telephone network service provider associated with the remote party. One example of a distinctive audio service prompt is well known in the art as consecutive high and low tones. The distinctive audio service prompt is typically generated responsive to a request for directory assistance information from the local party associated with the local telephone 110 to the telephone network service provider 114 associated with the remote party. The distinctive audio service prompt is part of an automated information delivery service operated by the telephone network service provider 114. The distinctive audio service prompt typically immediately precedes a synthesized voice signal having the requested information. The requested information may be presented in a format such as: "The number you have requested is 815 555 1234." Therefore, in this particular case the distinctive audio service prompt advantageously provides an automatic trigger for the local telephone 110 to convert the received synthesized voice signal into a text signal. The local telephone 110 may be controlled by a software menu feature or by a manual switch to enable or to disable this automatic trigger. Hence, in this particular situation, the local party no longer needs to have a pencil and paper ready to write down the transmitted voice information. The local telephone 110 automatically captures the voice signal, converts the voice signal into a text signal and stores the text signal into a memory unit for later reference or use.

Alternatively, at step 308, the storage prompt signal may be a command signal manually generated by the local party associated with the local telephone 110 in real time while the telephone call is in process. The local party may generate the command signal in any manner such as, for example, by pressing one of smart or control keys of the data input keys 206 during the telephone call. An advantage of this alternative is that the local party can arbitrarily determine which of the voice signals received from the remote party are to be converted into text signals. In this case the local party can record and/or transcribe particular received information, such as a name, telephone number and/or address in the middle of a conversation with the remote party. After the local party receives the desired information, the local party can manually generate the command signal again to stop the recording and/or voice transcription process. Feedback signals, such as a tone produced in the local telephone's earpiece speaker or loudspeaker, may be generated to give the local party that the command signal has been enabled and/or disabled during the telephone call.

At step 310, the local telephone 110 determines whether the first voice signal will be converted into a text signal in real time, as it is received from the remote telephone, or after the first voice signal is stored in the first memory unit 212. If the local telephone determines to convert into a text signal in real time, then the step of storing the first voice signal at step 312 is bypassed and the method continues to step 314. FIG. 2, line 224, alternatively shows an analogous hardware bypass for the first memory unit 212. If the local telephone determines not to convert a voice signal into a text signal in real time, then the method continues to step 312 to store the first voice signal. The determination at step 310 may be a programmable feature or a fixed feature of the local telephone depending on the desires of the manufacturer of the local telephone, the desires of the local party or the sophistication of the local telephone. In the preferred embodiment of the present invention, the first voice signal is stored in the first memory unit 212 before being converted to the first text signal to provide accurate and reliable transcription of the first voice signal into the first text signal. Because the first voice signal is stored in the first memory unit 212 the voice transcription software may read the stored first voice signal more than once, as in the real time case, to provide redundant transcription for the best quality transcription.

At step 312, the local telephone 110 stores the first voice signal in the first memory unit 212 responsive to the step of sensing the storage prompt signal at step 310. In the preferred embodiment of the present invention, the local telephone 110 stores the first voice signal in the memory unit in the local telephone 110 responsive to the step of receiving the distinctive audio service prompt signal and the step of receiving the synthesized or live voice signal from the telephone network service provider 114.

At step 312, the local telephone 110 senses a conversion prompt signal. In the preferred embodiment of the present invention, the conversion prompt signal is always activated, such as by a software menu selection, to permit the local telephone 110 to automatically convert the synthesized voice signal from the telephone network service provider to the first text signal for storage in the second memory unit 210 in the local telephone. Therefore, the local telephone 110 is always ready to convert the first voice signal and to store the first text signal when directory assistance is requested. Alternatively, the conversion prompt signal may be manually activated, such as via smart or control keys of the data input keys 206 to permit the local party to arbitrarily determine which of the directory assistance synthesized voice messages they wish to have converted and stored as text signals.

At step 316, the local telephone 110 converts the first voice signal to a first text signal responsive to the step of sensing the conversion prompt signal at step 314. The step of converting is performed by the voice to text signal processor 210 shown in FIG. 2. The voice transcription software used to implement the voice to text signal conversion is well known in the art. In the preferred embodiment of the present invention, a basic voice transcription software is used to transcribe only synthesized or live voice signals representing numeric data, such as a telephone number, received from the telephone network service provider 114. Alternatively, when the voice to text signal processor 210 is implemented outside the local telephone 110, such as in a personal computer, a more advanced voice transcription software is used, such as Dragon NaturallySpeaking Preferred™ for Pentium™ III sold by Dragon Systems, Incorporated, or similar software. The voice transcription software may be programmed to transcribe voice signals representing only alphabetical characters, only numeric characters, or both alphabetical and numeric characters. In the preferred embodiment of the present invention, the transcription software is programmed to transcribe voice signals representing only numeric characters. In this case, any words formed with alphabetical characters are ignored by the transcription software. By example, after the distinctive audio service prompt is received, the transcription software ignores the phrase "The number you have requested is" and transcribes only the numeric characters, representing the telephone number, "815 555 1234." Therefore, any undesirable transcription is advantageously avoided during the transcription process to limit any necessary editing of the transcribed text signals after the text signals have been transcribed and stored in the second memory unit 214.

At step 318, the first text signal is stored in the second memory unit 214 responsive to the step of converting at step 316. In the preferred embodiment of the present invention, the second memory unit 214 is located in the local telephone 110. Further details regarding the second memory unit 214 are discussed hereinabove with reference to FIG. 2.

Alternatively, during steps 306, 308, 310, 312, 314, 316 and 318 the local telephone 110 may also receive a second voice signal from another telephone during the telephone call. The second voice signal may be received at the same time as the first voice signal, as in a full duplex communication system (e.g. cellular or landline telephones) or may be received a different times as the first voice signal, as in a simplex or half duplex communication system (e.g. two way walkie talkies). In the preferred embodiment of the present invention, the second voice signal is generated by the local party speaking into the microphone 218 of the local telephone 110. Alternatively, the second voice signal may be generated by another remote party associated with a second remote telephone, such as in a three way call scenario. In the preferred embodiment, at step 306, the local telephone 110 receives the second voice signal from the local telephone 110 during the telephone call responsive to the step of establishing at step 304. At steps 308 and 310, the determinations of whether the storage prompt signal is received and whether the received voice signal should be converted into the text signal, respectively, are carried out in the same manner, as discussed hereinabove. At step 312, the local telephone 110 stores the second voice signal in the first memory unit 212 responsive to the step receiving of the second voice signal at step 306. At step 314, the determination of whether the conversion prompt signal has been received is carried out in the same manner, as discussed hereinabove. At step 314, the local telephone 110 converts the second voice signal into a second text signal. At step 318, the local telephone 110 stores the second text signal in the second memory unit 214 in the local telephone 110 responsive to the step of converting the second voice signal into the second text signal at step 508. After or in combination with step 318, the local telephone 110 distinguishes between the first text signal stored in the second memory unit 214 and the second text signal stored in the second memory unit 214. This distinguishing step is needed when two or more voices are present in order for the local party to determine differences between the text spoken by the remote party and the text spoken by the local party, for instance. The different text signals, referenced to the different parties, may be distinguished in the second memory unit 214 in many ways, such as by using, for example, different titles, such as "remote caller" and "local caller," immediately preceding the spoken text by the appropriate party, different font size or format, different columns on a page or screen, etc. The different text signals may also be distinguished by tone or level of voice, indication of male or female, order or simultaneous speaking of the parties, etc. By analogy only and without limitation, the text for two or more parties could read like a script for a play having two or more actors. All of the steps associated with multiple voice transcription assumes that the voice transcription software and hardware has the power and sophistication in order to handle multiple voices.

At step 320, the local telephone 110 determines whether an indication of an identity of the remote party associated with the telephone call is received. If the local telephone 110 determines that the indication of an identity of the remote party has not been received then the method continues to step 326; otherwise, the method continues to step 322. The indication of an identity of the remote party associated with the telephone call is generated by the caller identification unit 220 shown in FIG. 2. Caller identification units and their function are generally known in the art. In the preferred embodiment of the present invention, the indication of the identity of the remote party is a telephone number and/or a name is generated by the telephone network service provider 114. Alternatively, the indication of the identity of the remote party may be a telephone number and/or a name of the remote party automatically generated by the local telephone 110. Still alternatively, the indication of the identity of the remote party may be a telephone number and/or a name of the remote party manually generated by the local party.

At step 322, the local telephone 110 stores the indication of the identity of the remote party in at least one of the first memory unit 212 and the second memory unit 214.

At step 324, the local telephone 110 correlates the indication of the identity of the remote party with at least one of the first voice signal stored in the first memory unit 212 in the local telephone 110 and the first text signal stored in the second memory unit 214 in the local telephone 110. Steps 320, 322 and 324 advantageously permit a local party to effectively tag the received information with the identity of the remote party sending the information. By example, the remote party may tell the local party directions to a particular place. Steps 320, 322 and 324 effectively add an electronic label, indicating the source of the directions, to the directions. Therefore, the local party doesn't need to either remember who gave the directions or manually enter into the local telephone that gave the directions.

Steps 320, 322 and 324 are optional steps that may or may not be implemented into a telephone, as determined by a manufacturer of the telephone. Alternatively, steps 320, 322 and 324 may be menu driven features embodied within the software of the telephone, which may be selectively enabled or disabled by the local party.

Continuing with step 326, a determination is made whether or not to run an error checking program on the stored first text signal. If the determination is made to run the error checking program, the method continues to step 328 to run the error checking program. If the determination is made to not run the error checking program, the method continues to step 330. Depending on the type of error checking algorithm used in the error checking program at step 328, the method preferably feeds back from step 328 to one or more of steps 316, 318 and 326 in order to make sure that the first text signal was converted and stored accurately. Alternatively, an error checking program without feedback may be used. In the preferred embodiment of the present invention, a relatively simple error checking program is implemented in the local telephone 110. However, steps 326 and 328 are optional and may not be implemented or deactivated, if desirable. FIG. 2, line 226, shows the hardware connection between the second memory unit 214 and the voice to text processor 210 to permit these two circuits to communicate with each other to implement the error checking program.

At step 330, a determination is made whether or not to edit the stored first text signal. In the preferred embodiment of the present invention, this determination is made by a local party using the local telephone to permit the local party to advantageously correct or change the stored first text signal. For example, if the synthesized voice signal only contained a seven digit phone number, the local party may add the proper three digit area code to the seven digit phone number stored in the second memory unit 214 prior to storing the full ten digit phone number in a telephone directory location of the second memory unit 214. Alternatively, this determination may be made by the local telephone itself responsive to, for example, a software menu selection in the local telephone 110. If the determination is made to edit the stored first text signal, then the method continues to step 332. Otherwise, if the determination is made not to edit the stored first text signal, then the method continues to step 342.

At step 332, a determination is made whether or not to edit the stored first text signal or a copy of the stored first text signal. If the determination is made to edit the stored first text signal, then the method continues to step 340. Otherwise, if the determination is made to edit copy of the stored first text signal, then the method continues to step 334. In the preferred embodiment of the present invention, this determination is made by a local party using the local telephone 110 to permit the local party to advantageously correct or change the copy of the stored first text signal while comparing the edited copy of the stored first signal to the stored first signal itself.

At step 336, the local telephone 110 generates a copy of the first text signal stored in the second memory unit 214 to produce a copy of the first text signal.

At step 338, the local telephone 110 stores the copy of the first text signal in the second memory unit responsive to the step of generating at step 334. In the preferred embodiment of the present invention, the local telephone 110 automatically makes a backup copy of the stored first text signal for the local party to reference just in case the local party made a mistake while editing the copy of the stored first text signal.

At step 338, the local telephone 110 edits the copy of the first text signal responsive to the step of storing the first text signal at step 336 to produce an edited first text signal. In the preferred embodiment of the present invention, the local party causes the local telephone 110 to edit the copy of the first text signal by manipulating the data input keys 206. After step 338, the method continues to step 342.

Returning to step 340, the local telephone 110 edits the stored first text signal without making a backup copy. In the preferred embodiment of the present invention, the local party causes the local telephone 110 to edit the copy of the first text signal by manipulating the data input keys 206. After step 340, the method continues to step 342. Continuing with step 342, the local telephone 110 provides one of the unedited first text signal and the edited first text signal stored in the second memory unit 214 in the local telephone 110. This step of providing generally means that the local telephone uses the first text signal in some way to benefit the local party, several ways of which are outlined as follows. In the preferred embodiment of the present invention, the step 342 of providing is implemented as a step of making a new telephone call by the local telephone 110 to a third telephone using the first text signal stored in the second memory unit 214 in the local telephone 110. The third telephone may be the remote telephone 104 or another telephone. This step advantageously provides the local party with the ability to make a new telephone call using the stored telephone number received as a voice signal from the telephone network service provider 114.

Alternatively, the step 342 of providing may be implemented as the steps of making a new telephone call by the local telephone 110 to a third telephone using a new telephone number, different from the telephone number received from the remote telephone, and transmitting at least one of the first voice signal stored in the first memory unit in the local telephone 110 and the first text signal stored in the second memory unit 214 to the third telephone. The third telephone may be the remote telephone 104 or another telephone. This step advantageously provides the local party with the ability to forward the stored voice or text signal received from the remote telephone to the third telephone.

Still alternatively, the step 342 of providing may be implemented as the steps of electrically coupling the local telephone 110 to an electronic device, such as a personal computing device, and transmitting the first text signal stored in the second memory unit 214 to the electronic device. This step advantageously provides the local party with the ability to forward the stored text signal received from the remote telephone to other electronic devices. For example, the local party may with to transfer the stored text signals to a personal computer for inserting into a word processing file or an email message. Therefore, the local party does not need to take notes with a paper and pencil during the telephone call while on the local telephone and then type the notes into a personal computer to create a word document or send an email message to someone to relay the notes. Similar advantageous applications may be applied to personal digital assistants and other electronic devices.

In summary of the flowchart 300 the preferred embodiment of the present invention, as shown in FIG. 3, the method preferably includes step 304 of establishing the telephone call, step 306 of receiving the first voice signal from the remote telephone, step 314 of converting the received first voice signal to the first text signal, and step 318 of storing the first text signal. All of the other steps shown and described provide more features which may or may not be needed, used or implemented depending on various engineering tradeoffs, marketing preferences, feature options activated or not activated by the local party, etc. At step 338, the method of the flowchart 300 ends.

As a brief overview of some of the features provided in this detailed description of the preferred embodiment, a local telephone receives a voice signal from a remote telephone and transcribes the received voice signal into a text signal for storage in a memory unit. The scope of transcription may range from a relatively simple transcription as when transcribing numbers spoken by one party to relatively complex transcription as when transcribing a conversation spoken by two or more parties. The transcription and storage processes may be implemented in one electronic device, such as a cellular telephone, or be implemented among separate different electronic devices best suited for their functions, such as a cellular telephone for storing the received voice signal and a personal computer for transcribing the voice signal and storing the text signal. The local telephone may be implemented more typically as a landline or radio telephone, or more atypically as an interface for a laptop computer or an integral part of a personal computer having internet or intranet telephone capabilities.

Hence, while the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

The invention claimed is:

1. A method comprising:
    establishing at a local communication device a voice communication between the local communication device and a remote communication device;
    receiving a voice signal associated with the voice communication;
    determining, via the local communication device, whether to convert the voice signal into a text signal, to yield a determination, wherein the determination indicates to perform a conversion upon receiving a distinct audio service prompt; and
    when the determination indicates to perform the conversion:
        converting, via a processor, a portion of the voice signal to text, wherein the portion of the voice signal represents numerical values; and
        editing the text to yield edited text.

2. The method of claim 1, further comprising:
    receiving a signal from a user to store the portion.

3. The method of claim 2, wherein the local communication device receives the signal from the user via a data input key.

4. The method of claim 1, further comprising:
    transmitting one of the portion and the edited text to an additional device.

5. The method of claim 4, wherein the additional device provides delayed processing of the one of the portion and the edited text.

6. The method of claim 1, wherein converting the voice signal to text occurs in real time.

7. The method of claim 1, wherein a copy of the portion is stored in the local communication device.

8. A system comprising:
    a processor; and
    a computer-readable storage medium having instructions stored which, when executed by the processor, cause the processor to perform operations comprising:
        establishing at a local communication device a voice communication between the local communication device and a remote communication device;

receiving a voice signal associated with the voice communication;
determining, via the local communication device, whether to convert the voice signal into a text signal, to yield a determination, wherein the determination indicates to perform a conversion upon receiving a distinct audio service prompt; and
when the determination indicates to perform the conversion:
converting, via a processor, a portion of the voice signal to text, wherein the portion of the voice signal represents numerical values; and
editing the text to yield edited text.

9. The system of claim 8, the computer-readable storage medium having additional instructions stored which result in the operations further comprising:
receiving a signal from a user to store the portion.

10. The system of claim 9, wherein the local communication device receives the signal from the user via a data input key.

11. The system of claim 8, the computer-readable storage medium having additional instructions stored which result in the operations further comprising:
initiating a second voice communication between the local communication device and a second remote communication device associated with the numerical values.

12. The system of claim 8, the computer-readable storage medium having additional instructions stored which result in the operations further comprising:
transmitting one of the portion and the edited text to an additional device.

13. The system of claim 12, wherein the additional device provides delayed processing of the one of the portion and the edited text.

14. The system of claim 8, wherein converting the voice signal to text occurs in real time.

15. The system of claim 8, wherein a copy of the portion is stored in the local communication device.

16. A computer-readable storage medium having instructions stored which, when executed by a computing device, cause the computing device to perform operations comprising:
establishing at a local communication device a voice communication between the local communication device and a remote communication device;
receiving a voice signal associated with the voice communication;
determining, via the local communication device, whether to convert the voice signal into a text signal, to yield a determination, wherein the determination indicates to perform a conversion upon receiving a distinct audio service prompt; and
when the determination indicates to perform the conversion:
converting, via a processor, a portion of the voice signal to text, wherein the portion of the voice signal represents numerical values; and
editing the text to yield edited text.

17. The computer-readable storage medium of claim 16, the computer-readable storage medium having additional instruction stored which result in the operations further comprising:
receiving a signal from a user to store the portion.

18. The computer-readable storage medium of claim 17, wherein the local communication device receives the signal from the user via a data input key.

19. The computer-readable storage medium of claim 16, the computer-readable storage medium having additional instruction stored which result in the operations further comprising:
initiating a second voice communication between the local communication device and a second remote communication device associated with the numerical values.

20. The computer-readable storage medium of claim 16, the computer-readable storage medium having additional instruction stored which result in the operations further comprising:
transmitting one of the portion and the edited text to an additional device.

* * * * *